Oct. 16, 1928.
C. M. SHILLIAM
NEST STRUCTURE
Filed June 4, 1927
1,687,901
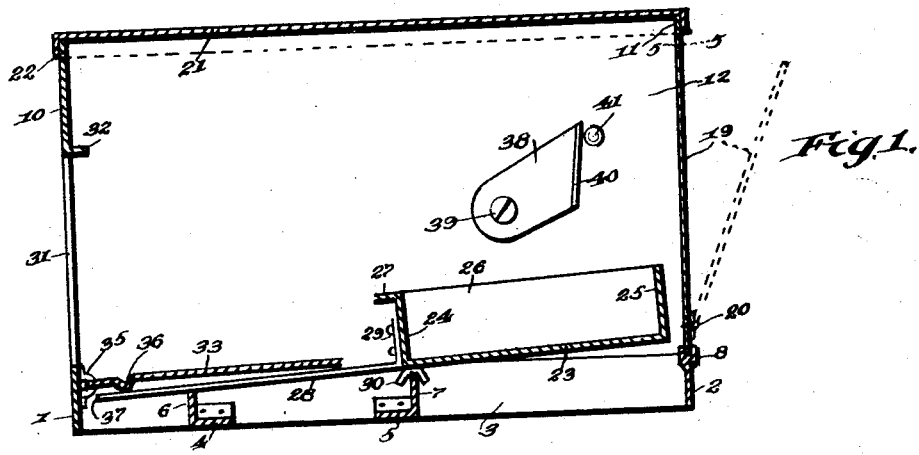
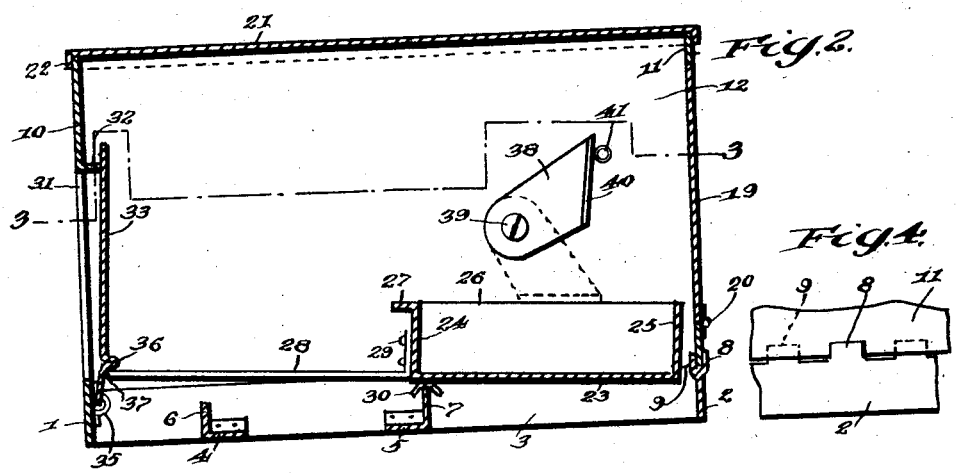
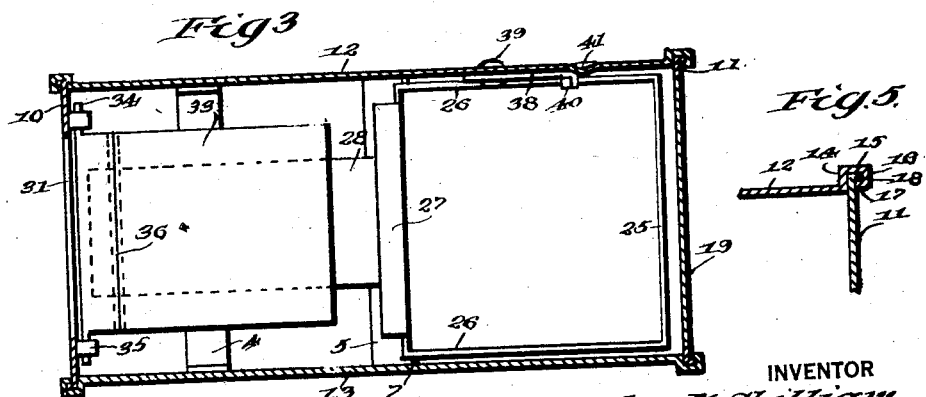
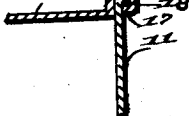
INVENTOR
Charles M. Shilliam
BY
Carl H. Crawford
ATTORNEY Patented Oct. 16, 1928.

1,687,901

UNITED STATES PATENT OFFICE.

CHARLES M. SHILLIAM, OF SPOKANE, WASHINGTON.

NEST STRUCTURE.

Application filed June 4, 1927. Serial No. 196,609.

The object of this invention is to provide an improved nest structure which is especially adapted for use in connection with commercial production of hens' eggs.

The invention involves a tiltable nest box and a gravity opening door associated in a novel manner so that the door will descend into an open position and form a runway on which the bird can walk to and from the nest.

A further feature resides in a novel structure whereby the door is automatically closed when the bird enters the nest box and is maintained closed as long as the weight of the bird is imposed on said box.

A further object is the provision of a perch on said nest box that is located in such a novel relation with respect to the point of fulcrum of the box that whenever the bird rests its weight on said perch either in entering or leaving the nest box, the latter will be tilted into a position to permit the gravity controlled door to open.

A further feature consists in means which may be so adjusted as to act automatically to lock the nest box in a descended position and thereby hold the door closed, whenever it is desired to use the structure for trap nesting purposes.

The invention has many other objects and features which will be more fully described in connection with the accompanying drawing and which will be more particularly pointed out in and by the appended claims.

In the drawing:

Fig. 1, is a vertical longitudinal sectional view of my improved nest structure showing the same in an adjustment for ingress or egress of the bird.

Fig. 2, is a similar view showing the parts in the adjustment wherein the bird is on the nest and the door is closed and held closed.

Fig. 3, is a horizontal sectional view on line 3—3 of Fig. 2.

Fig. 4, is a rear view of a portion of the structure.

Fig. 5, is an enlarged sectional view on line 5—5 of Fig. 1.

Like characters of reference designate similar parts throughout the different figures of the drawing.

I have embodied my invention in a knock-down structure which is preferably of sheet metal although I do not wish to be limited thereto in all forms of the invention. As shown, the structure includes a rigid sheet metal base having front and rear portions 1 and 2 and side portions 3, only one side portion being herein shown. The base includes cross members 4 and 5, the former having an upward projection 6, adapted to form a stop, and the latter having an upward projection 7, adapted to form a fulcrum, as will presently appear. Said cross members 4 and 5 will be suitably secured to the side portions 3, to stiffen the base, the latter being open for ventilating and sanitary purposes. The upper edge portions of the base may be provided with wall supporting means which may consist of oppositely bent lugs 8 and 9 between which the upright walls of the structure may seat.

The structure which is mounted on said base consists of upright front and rear walls 10 and 11, respectively and side walls 12 and 13. I have shown one means for detachably connecting the side and end walls in Fig. 5, the side walls having bent portions crimped to the form shown at 14 to 17. The rear wall has its vertical edge bent as indicated at 18. Thus, it will be clear that when the walls are respectively shifted into corner engagement, they will be held in such engagement, it being understood that a structure of this character need not be rigid. Thus, as all the walls are equipped with the same means shown in Fig. 5, they need not be described in detail. It may be stated that this means of fastening avoids pins, screws and like fastening means. The rear wall 11, is provided with what I will term a trap nest door 19, which may be hinged at 20, and which may have any suitable fastening means. This door is preferably of such size that the box nest, to be later described, can be withdrawn through such door when the latter is opened. Likewise, it is of sufficient size to withdraw the bird therethrough. I have provided the structure with a roof 21, which may have downwardly extending flanges 22 adapted to extend over the walls 10 to 13, and in this connection, it may be stated that the corner fastening means shown in Fig. 5, may be shortened to afford freedom for the flanges 22.

Thus, it will be seen that the structure, as far as the housing is concerned, is clearly knock-down, and may be taken apart readily for cleaning or shipping. The fact that the housing is of metal, affords the usual protection against the usual pests.

I have shown a nest box having a bottom 23, of any form of open or foraminated material, and front and rear walls 24 and 25, respectively, and side walls 26. A portion of the front wall 24, is bent forwardly as at 27, to form a perch onto which the bird can step when entering or leaving the nest. Fixed to the front wall 24, is a forwardly extending door operating bar 28, which may be secured to said wall 24, as shown at 29. The nest structure is tiltable on a fulcrum which I have referred to as 7, and on the bottom of the nest box I have shown an inverted V-shaped guide 30, fixed thereto, to retain the nest box in fulcrumed relation to part 7. The line of fulcrum is so disposed that the greater weight of the nest box structure is to the right of the fulcrum, viewing Fig. 2. Thus, the nest box would normaly seek the position shown in said figure. It will also be noted that the perch 27 is slightly to the left of the line of fulcrum so that when the bird leaves the nest and jumps onto the perch 27, the structure will take the position shown in Fig. 1.

The front wall 10 is shown provided with a door opening 31, and at the top thereof, the metal is bent inwardly, as shown at 32, to form a stop for the door. I have indicated the door at 33, the same having trunnion hinge pintles 34, projecting laterally therefrom. Strap or like hinge members 35, secured to wall 10, coact with said pintles to form a hinged connection. Now by reason of the foregoing, the door 33, will always seek to open by gravity just as soon as it is free so to do. The door 33 is provided with means which may be a bent or offset portion 36, adapted for coaction with the outer end 37, of bar 28.

A trap lock is shown in the form of a retainer 38, which is pivoted at 39, and has a flange 40, adapted to engage one of the walls 26, of the nest box. When the structure is not being used as a trap nest, the retainer 38 is held in an inoperative position by the simple expedient of an inwardly projecting portion 41 of wall 12. When it is desired to trap nest, the retainer is sprung over said stop 41 and allowed to descend toward the wall 26, with the nest box in the Fig. 1, position. After the bird gets into the nest and the latter descends to the Fig. 2, position, the retainer advances by gravity into the dotted line position shown in Fig. 2, and locks the nest box against being tilted upwardly, thereby holding the door 33 closed and trapping the bird. The door 19, affords access to the trapped bird and for removal of the eggs.

The operation will be clear from the foregoing but may be briefly recapitulated as follows:

In the Fig. 1, position, the bird is free to enter the opening 31 and advance along the door 28, and hop onto the perch 27, and thence into the nest box. The weight of the door 33, on bar 28, holds the nest structure tilted as shown in Fig. 1. However just as soon as the bird gets into the nest box, the added weight tilts the box to the Fig. 2, position, the bar 28, elevating the hinged door 33 into a closing position. After the hen has laid, she jumps up on perch 27, thereby throwing her weight on the left hand side of the fulcrum axis and the nest structure tilts back to the Fig. 1, position, the door 33 falling by gravity onto bar 28 and again acting as a runway on which the bird walks out of the housing. It will thus be seen that I make the door perform the dual function of a closure for the opening 31 and a runway for the bird to walk on in advancing toward or leaving the nest box.

It will thus be seen that the parts move by gravity in all respects and that the nest box may readily be removed through the door 19, or out through the bottom of the base, which is open. Portions of the walls, top and the door 33, may be perforated for affording proper ventilation, as experience may dictate, and other changes of refinement and mechanical skill may be made without altering the spirit of the invention.

While I provide a stop to limit tilting movement of the nest structure when the door is open, it will be noted that when the structure closes the door, the means 36, with which the bar end 37, coacts, functions as a stop.

The operation of the structure as regards trap nesting will have been understood from the foregoing description of that feature.

It is believed that the device of my invention will be fully understood from the foregoing description, and while I have herein shown one specific form of my invention, I do not wish to be limited thereto except for such limitations as the claims may import.

I claim:

1. In a nest structure, a housing having a door opening in the front wall thereof for ingress and egress of the bird, said housing being normally otherwise closed to ingress or egress of a bird, a nest box rearwardly from said opening and provided on its forward end with a perch and having a forwardly extending door operating bar, means fulcrumly supporting said nest box sufficiently rearwardly of said perch to cause the weight of the bird thereon to elevate said box and lower said bar and the weight of the bird causing said box to descend when sitting on said box, and a door for said opening hinged to swing inwardly and downwardly by gravity onto said bar to form a runway for the bird to walk from said opening toward said perch and box and from said box and perch outwardly through said opening.

2. In a nest structure, a housing having a door opening in its front wall for ingress and egress of the bird, said housing being normally otherwise closed to ingress or egress of a bird, a nest box fulcrumed in said housing to normally descend therein and having a door actuating bar projecting forwardly therefrom, a door for said opening hinged to open by gravity down onto said bar and form a runway for the bird to walk to and from said nest box and acting to tilt said nest box upwardly, said door having means for engagement by said bar to close said door when the bird enters and tilts said nest box downwardly.

3. In a nest structure, a housing having a door opening in its front wall for ingress and egress of the bird and said housing being otherwise normally closed to ingress or egress of a bird, a nest box fulcrumed in said housing to normally descend under its own weight and having a door actuating bar projecting forwardly therefrom, a door for said opening hinged to open by gravity down onto said bar to form a runway and acting to tilt said nest box upwardly, said door having means for engagement by said bar for closing and holding said door closed when and after the bird enters said nest box, and means automatically locking said nest box in a descended and door locking position to confine the bird in the nest.

In testimony that I claim the foregoing as my own, I hereby affix my signature.

CHARLES M. SHILLIAM.